United States Patent [19]
Smith

[11] 3,964,236
[45] June 22, 1976

[54] STUFFING TUBE APPARATUS FOR AN ENCASING MACHINE

[75] Inventor: David W. Smith, West Des Moines, Iowa

[73] Assignee: Townsend Engineering Company, Des Moines, Iowa

[22] Filed: Apr. 7, 1975

[21] Appl. No.: 566,035

[52] U.S. Cl. .................................... 53/122; 17/41
[51] Int. Cl.² ........................................ B65B 3/10
[58] Field of Search .................. 53/122; 17/35, 41

[56] References Cited
UNITED STATES PATENTS

| 557,032 | 3/1896 | Sideman | 17/41 X |
| 1,043,241 | 11/1912 | Louden | 17/41 |
| 3,703,064 | 11/1972 | Lugiewicz | 53/122 |

*Primary Examiner*—Travis S. McGehee
*Attorney, Agent, or Firm*—Zarley, McKee, Thomte & Voorhees

[57] ABSTRACT

A stuffing tube apparatus for an encasing machine which includes a product pump in combination with a source of meat product and having an outlet conduit extending therefrom. The outlet conduit of the product pump is in communication with a conduit extending through a spindle member which is rotatably mounted in a spindle housing. The stuffing tube apparatus comprises a stuffing tube support member which is rotatably mounted on the spindle housing and which has at least a pair of stuffing tubes mounted thereon in a spaced apart relationship. The stuffing tube support member may be manually rotated with respect to the spindle housing so that the inlet end of one of the stuffing tubes is placed in operative engagement with the spindle so that the spindle conduit is in communication with the inlet end of the one stuffing tube. The other stuffing tube is in a casing loading position when the said one stuffing tube is in the encasing position. Means is provided for imparting rotational movement from the spindle to the stuffing tube which is in engagement therewith. Means is also provided for maintaining the support member and stuffing tubes in preselected positions relative to the spindle.

11 Claims, 9 Drawing Figures

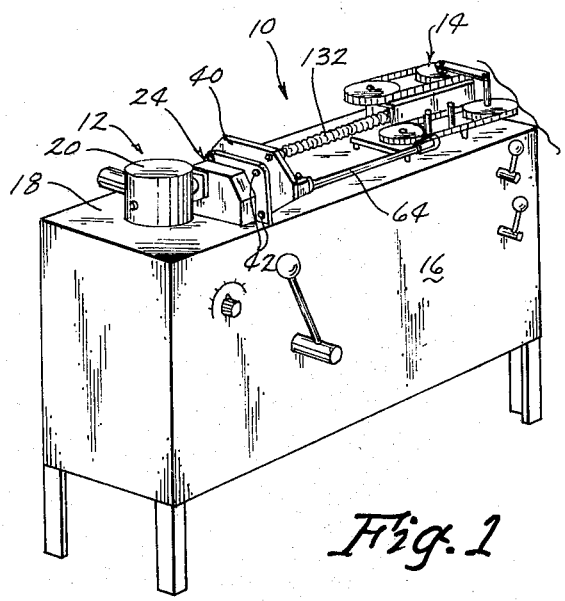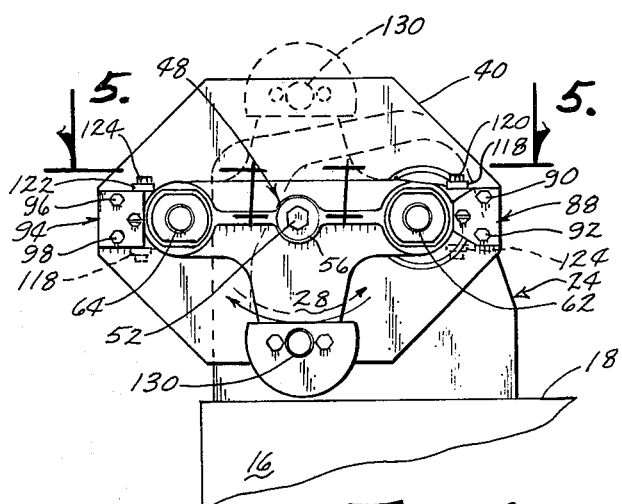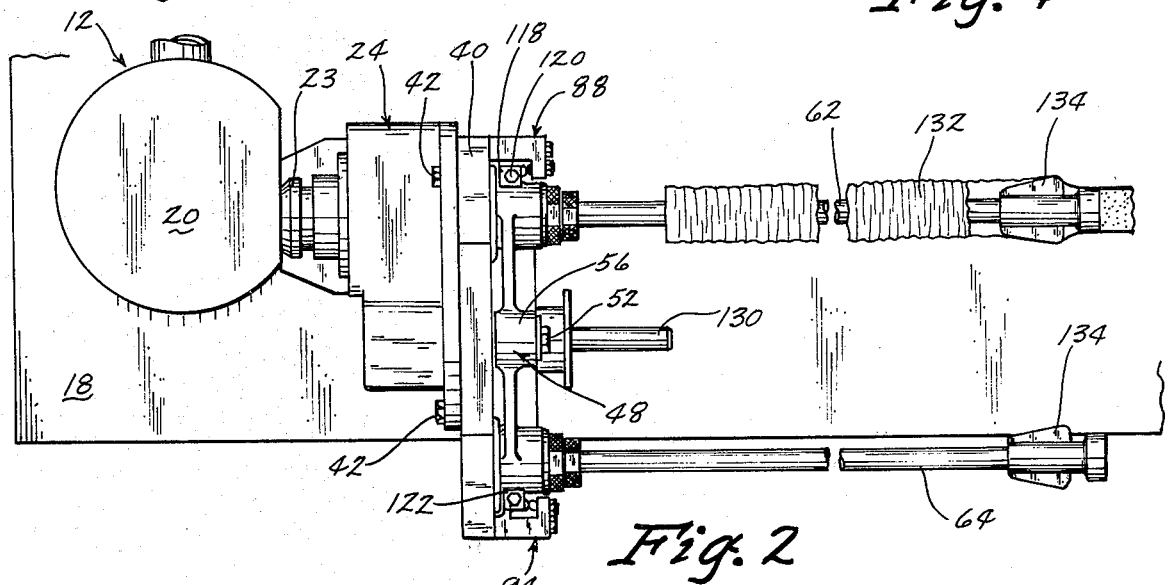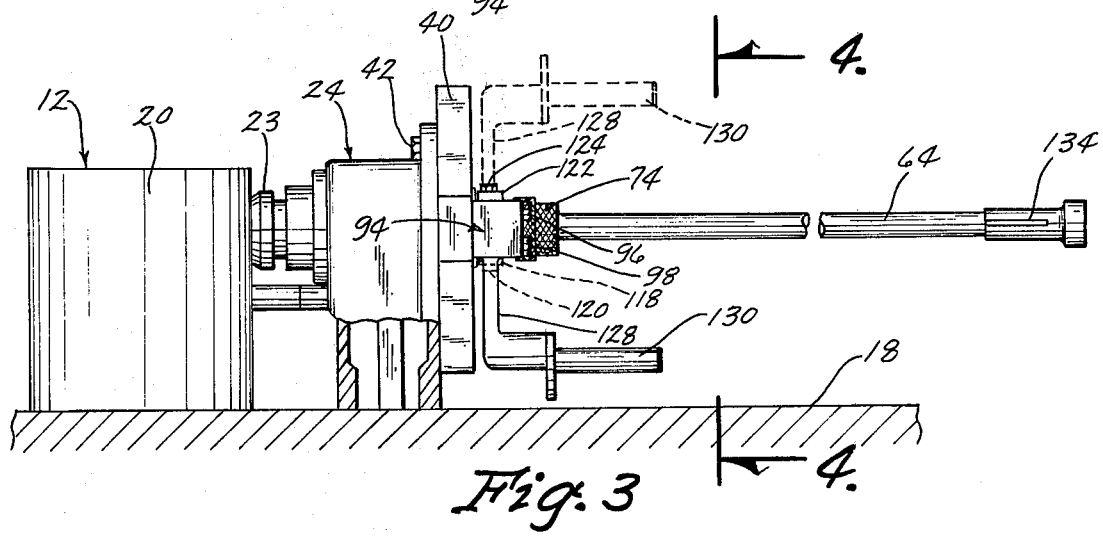

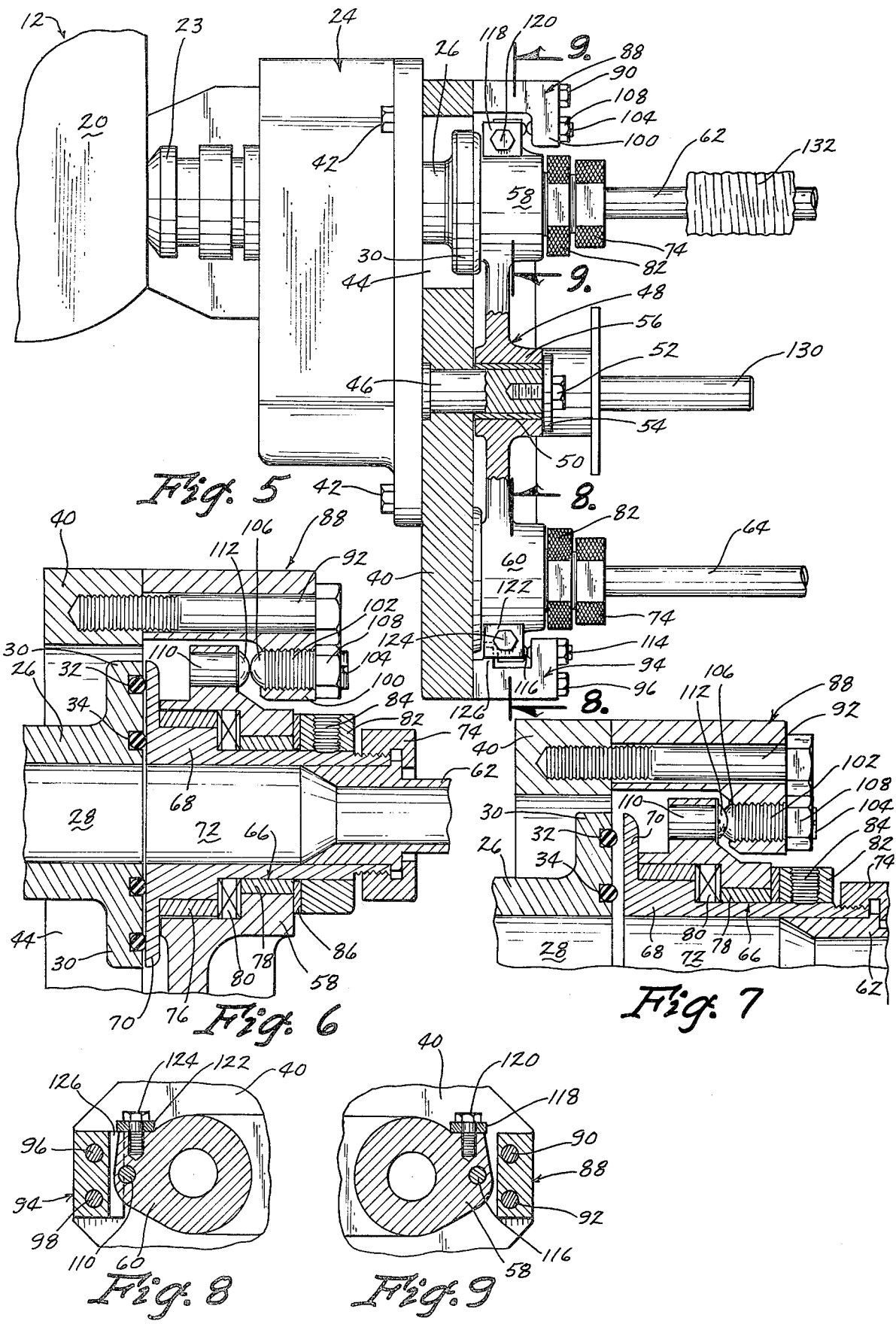

STUFFING TUBE APPARATUS FOR AN ENCASING MACHINE

BACKGROUND OF THE INVENTION

This invention relates to a stuffing tube apparatus or assembly for an encasing machine and more particularly to a stuffing tube apparatus comprising a pair of stuffing tubes which may be alternately placed in communication with the meat product pump.

Presently known product encasing devices include a stuffing tube, a pump for pumping plastic products through the stuffing tube, a rotary chuck in front of the discharge end of the stuffing tube, linking apparatus for linking the filled casing, and looping apparatus for arranging the links in loops. Prior to the encasing operation, a folded casing is mounted over the stuffing tube. The folded casing is compressed in an accordion-like fashion, and includes one unfolded end protruding beyond the discharge end of the stuffing tube. As the product issues from the discharge end of the stuffing tube, it fills the portion of the casing protruding therebeyond, thereby filling the casing and propelling it away from the discharge end so that additional portions of the casing will be unfolded and moved in front of the discharge end of the stuffing tube.

A conventional encasing machine requires considerable machine down time when the folded casings are inserted into the machine. An attempt was made to reduce the machine down time in applicants' earlier filed application, Ser. No. 315,100. In said earlier application, the stuffing tube was mounted in a socket-like member so that the stuffing tube could be pivotally moved upwardly when it was necessary to install a new casing thereon. The stuffing tube apparatus disclosed in the earlier application truly represented a significant advance in the art and the instant invention represents a significant advance over applicants' earlier application in that the machine down time is even further reduced.

Therefore, it is a principal object of the invention to provide a stuffing tube apparatus for an encasing machine.

A further object of the invention is to provide a stuffing tube apparatus for an encasing machine which substantially reduces the amount of machine down time when the casings are being replaced on the stuffing tubes.

A further object of the invention is to provide a stuffing tube apparatus for an encasing machine wherein a pair of stuffing tubes are mounted on a stuffing tube support, with one of the stuffing tubes being in an encasing position with the other of the stuffing tubes being in a loading position.

A further object of the invention is to provide a stuffing tube apparatus for an encasing machine which is economical of manufacture and durable in use.

These and other objects will be apparent to those skilled in the art.

BRIEF DESCRIPTION OF THE DRAWINGS

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a partial perspective view of a conventional encasing machine having the apparatus of this invention mounted thereon:

FIG. 2 is a partial top plan view of the stuffing tube apparatus of this invention:

FIG. 3 is a partial side view of the stuffing tube apparatus of this invention:

FIG. 4 is a sectional view seen on lines 4 — 4 of FIG. 3.

FIG. 5 is an enlarged sectional view seen on lines 5 — 5 of FIG. 4 with portions thereof cut-away to more fully illustrate the invention:

FIG. 6 is a partial sectional view taken through the spindle and the stuffing tube in engagement therewith:

FIG. 7 is a partial sectional view similar to that of FIG. 6 except that the stuffing tube support has been rotated from the position of FIG. 6:

FIG. 8 is a sectional view taken on lines 8 — 8 of FIG. 5; and

FIG. 9 is a sectional view taken on lines 9 — 9 of FIG. 5.

DESCRIPTION OF THE PREFERRED EMBODIMENT

Referring to the drawings, the numeral 10 generally designates an apparatus for encasing a product so as to produce sausages, franks and the like. Apparatus 10 includes a casing filling apparatus 12 and a linking apparatus 14. The looping apparatus generally associated with apparatus 10 has not been shown for purposes of conciseness. The casing filling apparatus 12 and linking apparatus 14 are mounted on a support cabinet 16 having the conventional drive components therein.

Casing filling apparatus 12 is mounted on and supported by cabinet top 18 and includes a metering product pump 20 which is adapted to pump continuously products of plastic consistency. Product pumps of this type are known in the art and therefore further description of pump 20 is unnecessary other than to state that it includes an inlet 22 adapted to be connected to a conduit leading from a supply of plastic products, and further includes an outlet conduit 23 which is adapted to receive the product being discharged from the pump 20.

Casing filling apparatus 12 also includes a spindle housing 24 having a spindle member 26 rotatably mounted therein. Spindle 26 is provided with a conduit 28 extending therethrough, the inlet end of which is in operative communication with the outlet conduit 23 of pump 20. Conventional power means is provided for rotating the spindle 26 in conventional fashion. Spindle 26 includes a flange-like outer end 30 having a pair of annular grooves 32 and 34 formed therein which receive O-rings 36 and 38 therein respectively.

As seen in the drawings, plate 40 is secured to spindle housing 24 by bolts 42. Plate 40 is provided with an opening 44 which receives spindle 26 as illustrated in FIG. 5. Shaft 46 is secured to and extends from plate 40. Stuffing tube support 48 is rotatably mounted on the shaft 46 and has a bearing or bushing 50 positioned therebetween. Screw or bolt 52 threadably extends into the outer end of shaft 46 as illustrated in FIG. 5. Washer 54 is positioned between the head of the bolt 52 and the end of shaft 46 and engages the hub portion 56 of support 48 to mount the support 48 on shaft 46. Bolt 52 is not completely tight so as to permit slight longitudinal movement of hub portion 56 relative to shaft 46.

Support 48 includes a pair of laterally extending portions 58 and 60 which rotatably support one end of stuffing tubes 62 and 64 respectively. The numeral 66 refers generally to the means for rotatably mounting the stuffing tube 62 in the portion 58 and is best seen in FIG. 6. Mounting means 66 generally comprises a collar 68 having a flange-like portion 70 at the inner end thereof which is generally complementary to the portion 30 of spindle 26. Collar 68 is provided with a conduit or bore 72 extending therethrough which is adapted to communicate with the conduit 28. One end of stuffing tube 62 is received by the bore 72 and is maintained therein by the cap member 74 which is threadably mounted on the outer end of collar 68 as seen in FIG. 6. Suitable bushings 76, 78 and bearing 80 are provided between the collar 68 and the portion 58 to enable the collar 68 to freely rotate with respect to the support 48 as will be described in more detail hereinafter. Retainer ring or collar 82 embraces the outer end of collar 68 and engages the portion 58 to mount the collar 68 thereon. Set screw 84 threadably extends inwardly through the collar 82 for engagement with the collar 68 to maintain collar 82 in position. Bushing 86 is provided between collar 82 and portion 58 as seen in FIG. 6. Inasmuch as the stuffing tubes 62 and 64 are identical, only stuffing tube 62 will be described in detail.

Bracket 88 is secured to one end of plate 40 by a pair of bolts 90 and 92 while a bracket 94 is secured to the other end of plate 40 by a pair of bolts 96 and 98. Bracket 88 includes an inwardly extending portion 100 which has a threaded bore 102 formed therein. Detent pin 104 is threadably mounted in bore 102 and has a rounded end portion 106 provided thereon. Pin 104 is locked in position by the lock nut 108. As seen in FIG. 6, portion 58 has a detent pin 110 mounted therein which has a rounded end portion 112 which is adapted to engage the end portion 106 of pin 104 as will be described in more detail hereinafter. Similarly, a detent pin 114 is mounted in bracket 94 for engagement with a detent pin 116 mounted on portion 60.

Stop plate 118 is secured to portion 58 by screw 120. Stop plate 122 is secured to portion 60 by screw 124. As seen in FIGS. 5 and 8, the stop plate 122 engages the portion 126 of bracket 94 to limit the movement of support 48 relative to plate 40. When support 48 has been rotated 180° from the position of FIG. 5, stop plate 118 engages the underside of portion 126 of bracket 94 to limit the movement of support 48 relative to plate 40. Support 48 also includes a laterally extending portion 128 which is positioned between portions 58 and 60. Handle 130 is secured to and extends horizontally from portion 128 as seen in the drawings.

For purposes of description, the numeral 132 will refer to the conventional folded casing while the numeral 134 will be used to identify a finhead assembly mounted on the discharge end of the stuffing tubes.

Assuming that neither of the stuffing tubes have a casing mounted thereon and that neither of the stuffing tubes is in an operative position, the normal method of operation is as follows. The fin-head 134 would normally be removed from the stuffing tube and the folded casing slipped thereover or loaded thereon in conventional fashion. The fin-head 134 would then be reinstalled. This operation would normally be accomplished by the operator who would be standing at the side of cabinet 16 which is illustrated in FIG. 1. When the casing 132 has been loaded on the stuffing tube, the handle 130 is grasped by the operator to impart rotational movement to the support member 48 with respect to the shaft 46 and the spindle housing 24.

As seen in FIG. 7, the flange-like portion 70 of the collar 68 is normally spaced from the flange-like member 30 of spindle 26. It can also be seen in FIG. 7 that the rounded end portions 106 and 112 of detent pins 104 and 110 respectively normally "overlap" or extend beyond each other. As the support 48 is rotated so that the collar 68 is approaching alignment with the spindle 26, the rounded end portions 106 and 112 engage each other and continued rotation of the support 48 causes the collar 68 and the support 48 to be moved to the left as viewed in FIG. 7. The support 48 is rotated until the stop plate 122 engages the portion 126 of bracket 94 which causes the conduit 28 and 72 to be aligned. FIG. 6 illustrates the collar 68 in its operative condition with the flange-like portion 70 being urged into frictional engagement with the O-rings 36 and 38 in the flange-like member 30 by the opposing detent pins 104 and 110. Thus, stop plate 122 limits the rotational movement of support member 48 in one direction relative to the spindle 24 so that the detent pins 104 and 110 are in an aligned condition. The O-rings 36 and 38 not only prevent the meat product from escaping from the spindle 26 and the collar 68 but also serve to provide the necessary frictional engagement therebetween so that rotation of the spindle 26 will cause rotation of the collar 68 and the stuffing tube 62.

Thus, when stuffing tube 62 is in the operative position, the encasing machine may be actuated so that the meat product is pumped through the conduit 28, bore 72 and into the interior of the stuffing tube 62 so that the casing will be filled at the discharge end of the stuffing tube 62. While stuffing tube 62 is in the operative or encasing position, the operator may load a casing on the stuffing tube 64 so that it will be ready for use at the desired time. When the casing 132 on stuffing tube 62 has been expended, the operator will momentarily de-activate the encasing machine and he will then rotate the support 48 relative to the plate 40 and housing 24. FIG. 4 illustrates the manner in which the support 48 is rotated relative to the plate 40. The handle 130 is grasped and the support member 48 rotated in a clockwise direction as viewed in FIG. 4 until the handle 130 is in the position indicated by the dotted lines in FIG. 4. The support member 48 is rotated in the clockwise direction as viewed in FIG. 4 until the stop plate 118 engages the underside of the bracket 94 which limits the rotational movement of the support member 48 in that direction. When stop plate 118 is in engagement with the underside of the bracket 94, the collar in which the stuffing tube 64 is mounted will be in operative alignment with and in engagement with the spindle 26 so that the meat product may be pumped through the stuffing tube 64. It should be noted that the detent pins 114 and 116 are provided to urge the flange-like portion of the collar of the mounting means into engagement with the plate 40 to further aid in maintaining the rotatable support member 48 in position. When the stuffing tube 64 is in the operative position, the stuffing tube 62 will be in the loading position so that a casing may be installed on stuffing tube 62. Ordinarily, the encasing machine would be activated prior to a casing being installed on the stuffing tube which is in the loading position.

It can be seen that very little machine down time is required when changing from one stuffing tube to another stuffing tube since the stuffing tube has been previously loaded with the casing. In the conventional encasing machines, considerable machine down time was involved since only a single stuffing tube was employed which required the necessity of the machine being shut down while the casing was installed on the stuffing tube.

It can be seen that a novel stuffing tube apparatus has been disclosed for an encasing machine which results in improved efficiency for the encasing machine and which accomplishes at least all of its stated objectives.

I claim:

1. In combination,
   an encasing machine comprising, a metering product pump in communication with a source of plastic meat product and having an outlet conduit extending therefrom to continuously pump a plastic meat product therethrough.
   a support means on said encasing machine,
   a stuffing tube assembly mounted on said support means comprising a support member selectively movably mounted on said support means and having at least a pair of elongated stuffing tubes mounted thereon in a spaced apart relationship, each of said stuffing tubes having inlet and discharge ends,
   and means for selectively moving said support member so that the inlet end of one of said stuffing tubes is placed in operative communication with said outlet conduit and so that the other stuffing tube is moved to a loading position to enable a folded casing to be mounted thereon,
   said encasing machine having a spindle means mounted thereon having a conduit extending therethrough which is connected to said pump outlet conduit,
   power means for rotating said spindle means,
   said one stuffing tube being operatively connected to said spindle means so that rotation of said spindle means causes said one stuffing tube to be rotated about its longitudinal axis,
   said inlet end of said one stuffing tube being in operative communication with said spindle means conduit.

2. The combination of claim 1 wherein said spindle means has a flange-like member at one end thereof, said support member having at least a pair of rotatable supports mounted thereon which support the inlet ends of said stuffing tubes, said rotatable supports having a flange-like member on one end thereof adapted to be selectively placed in frictional engagement with the flange-like member of said spindle means so that rotation of said spindle means causes said rotatable support and said stuffing tube to be rotated.

3. The combination of claim 2 wherein each of said rotatable supports comprises a collar having said flange-like member at one end thereof, the inlet end of the stuffing tube being removably mounted in said collar.

4. The combination of claim 2 wherein means is provided for selectively maintaining said flange-like members in frictional engagement with each other.

5. The combination of claim 2 wherein said support member is also movable towards and away from said spindle means, said flange-like member of said rotatable supports normally being spaced from said flange-like member of said spindle means, and positioning means for moving said flange-like member of said rotatable support into frictional engagement with said flange-like member of said spindle means when the inlet end of one of the stuffing tubes is placed in operative communication with the spindle means conduit.

6. The combination of claim 5 wherein said positioning means comprises at least a first detent pin means mounted on said support member and a second detent pin means operatively mounted on said spindle means, said first detent pin means adapted to engage said second detent pin means to cause said flange-like member of said rotatable support to move towards said flange-like member of said spindle means.

7. The combination of claim 6 wherein stop means is provided on said support member adapted to engage said spindle means to align said first detent pin means with said second detent pin means.

8. In combination,
   an encasing machine comprising, a metering product pump in communication with a source of plastic meat product and having an outlet conduit extending thereform to continuously pump a plastic meat product therethrough,
   a support means on said encasing machine,
   a stuffing tube assembly mounted on said support means comprising a support member selectively movably mounted on said support means and having at least a pair of elongated stuffing tubes mounted thereon in a spaced apart relationship, each of said stuffing tubes having inlet and discharge ends,
   and means for selectively moving said support member so that the inlet end of one of said stuffing tubes is placed in operative communication with said outlet conduit and so that the other stuffing tube is moved to a loading position to enable a folded casing to be mounted thereon,
   and means for rotating said one stuffing tube about its longitudinal axis when said one stuffing tube is in operative communication with said outlet conduit.

9. The combination of claim 8 wherein means is provided for selectively maintaining said support member in various positions of its movement.

10. The combination of claim 9 wherein said means for selectively maintaining said support member in various positions of its movement comprises a detent means.

11. The combination of claim 8 wherein said support member has a handle means thereon for selectively rotating said support member.

* * * * *